US009316841B2

(12) United States Patent
De Zwart et al.

(10) Patent No.: US 9,316,841 B2
(45) Date of Patent: Apr. 19, 2016

(54) MULTIVIEW DISPLAY DEVICE

(75) Inventors: Siebe Tjerk De Zwart, Eindhoven (NL); Willem Lubertus Ijzerman, Eindhoven (NL); Ralph Antonius Cornelus Braspenning, Eindhoven (NL); Marc Joseph Rita Op De Beeck, Eindhoven (NL); Robert-Paul Mario Berretty, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2402 days.

(21) Appl. No.: 10/598,643

(22) PCT Filed: Mar. 4, 2005

(86) PCT No.: PCT/IB2005/050811
§ 371 (c)(1),
(2), (4) Date: Sep. 7, 2006

(87) PCT Pub. No.: WO2005/091050
PCT Pub. Date: Sep. 29, 2005

(65) Prior Publication Data
US 2007/0177006 A1     Aug. 2, 2007

(30) Foreign Application Priority Data

Mar. 12, 2004 (EP) .................................... 04101024
Jan. 12, 2005 (EP) .................................... 05100139

(51) Int. Cl.
*G02B 27/22* (2006.01)
*H04N 5/14* (2006.01)
*H04N 13/04* (2006.01)

(52) U.S. Cl.
CPC ............. *G02B 27/2214* (2013.01); *H04N 5/14* (2013.01); *H04N 13/0402* (2013.01); *H04N 13/0497* (2013.01)

(58) Field of Classification Search
CPC . G02B 27/2214; H04N 13/0497; H04N 5/14; H04N 13/0402
See application file for complete search history.

(56) References Cited

U.S. PATENT DOCUMENTS 5,808,792 A  *  9/1998  Woodgate et al. ............ 359/463
5,991,073 A     11/1999  Woodgate et al.
(Continued)

FOREIGN PATENT DOCUMENTS

CN         1349711 A      5/2002
EP         0726482 A2     8/1996
(Continued)

OTHER PUBLICATIONS

Galpin et al, "Sliding Adjustment for 3D Video Representation", EURASIP Journal on Applied Signal Processing, vol. 2002, No. 10, Aug. 31, 2002, pp. 1088-1101.
(Continued)

*Primary Examiner* — Amr Awad
*Assistant Examiner* — Andre Matthews

(57) ABSTRACT

A multiview display device displays multiple views having respective viewing angles related to an object to be displayed. The display device includes an optical device for displaying multiple viewing cones. A first cone of the multiple viewing cones has different views so that a different view is observed by a right eye and a left eye of a viewer of the multiview display device. The different views of the first cone have an angular distribution relative to the display device, where sets of image data are provided such that the angular distribution has a first part of adjacent views with increasing viewing angle and a second part of adjacent views with decreasing viewing angle. Further, the angular distribution has a first one of the views in between a maximum view which corresponds to a maximum viewing angle and a minimum view which corresponds to a minimum viewing angle.

11 Claims, 11 Drawing Sheets

(56) References Cited

U.S. PATENT DOCUMENTS

Figure 1:
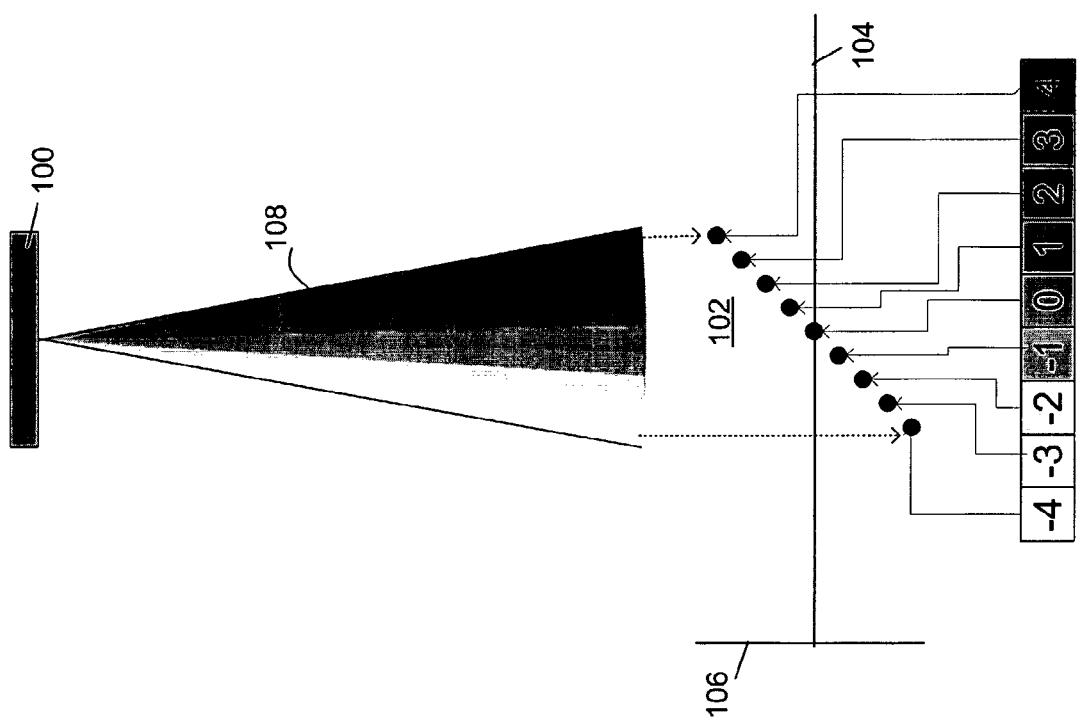

| | | | |
|---|---|---|---|
| 6,064,424 | A | 5/2000 | Van Berkel et al. |
| 6,100,941 | A | 8/2000 | Dimitrova et al. |
| 6,118,584 | A | 9/2000 | Van Berkel et al. |
| 6,496,228 | B1 | 12/2002 | McGee et al. |
| 6,888,540 | B2 * | 5/2005 | Allen .......................... 345/419 |
| 2002/0063914 | A1 * | 5/2002 | Steiner ........................ 359/15 |
| 2005/0089212 | A1 * | 4/2005 | Mashitani et al. ............ 382/154 |

FOREIGN PATENT DOCUMENTS

| | | |
|---|---|---|
| EP | 0721131 A2 | 10/1996 |
| EP | 0786912 A2 | 7/1997 |
| WO | 0079800 A1 | 12/2000 |
| WO | 0150737 A3 | 7/2001 |

OTHER PUBLICATIONS

Dodgson et al, "Multi-View Autostereoscopic 3D Display", University of Cambridge Computer Laboratory, UK, undated.

Van Berkel et al, "Multiview 3D-LCD", Proceedings of the SPIE, vol. 2653, 1996, pp. 32-39.

Lienhart, "Comparison of Automatic Shot Boundary Detection Algorithms", Proceedings of Storage and Retrieval for Image and Video Databases VII, vol. 3656, Jan. 1999, pp. 290-301.

Redert et al, "Synthesis of Multi Viewpoint Images at Non-Intermediate Positions", Proceedings of International Conference on Acoustics, Speech, and Signal Processing, vol. IV, 1997, pp. 2749-2752.

* cited by examiner

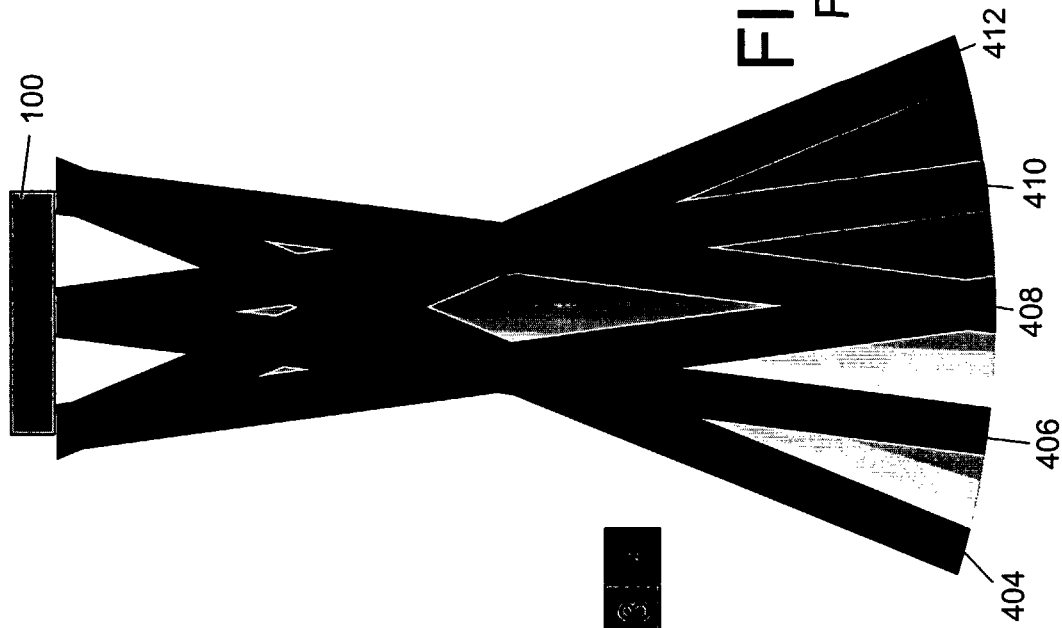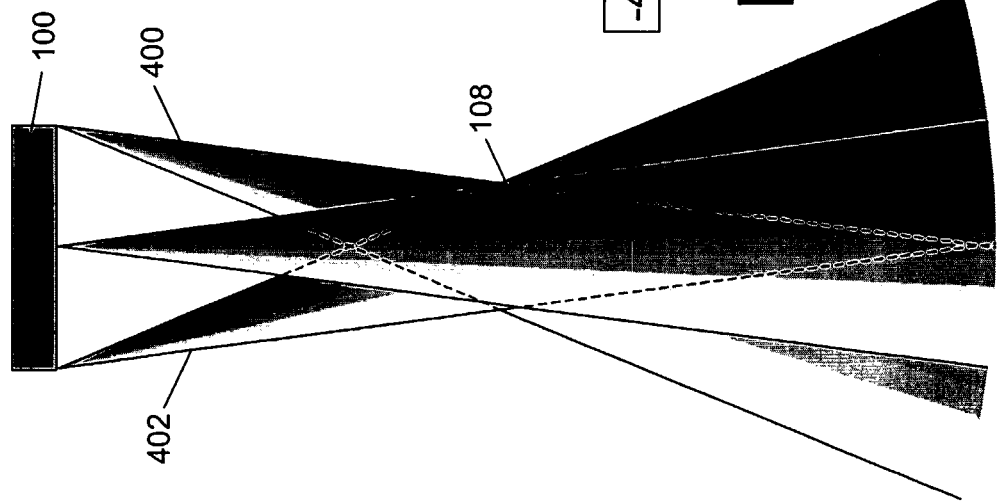

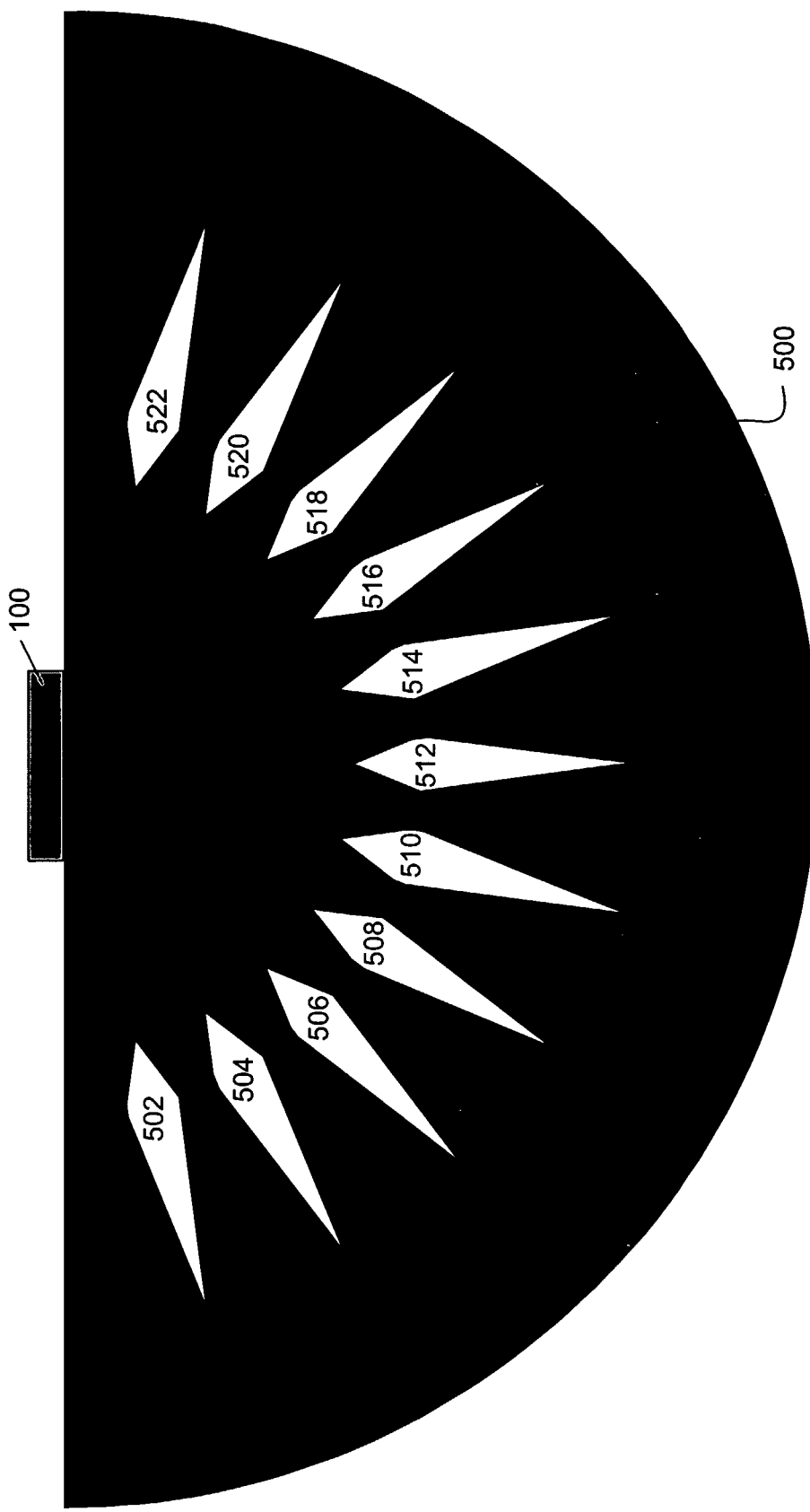

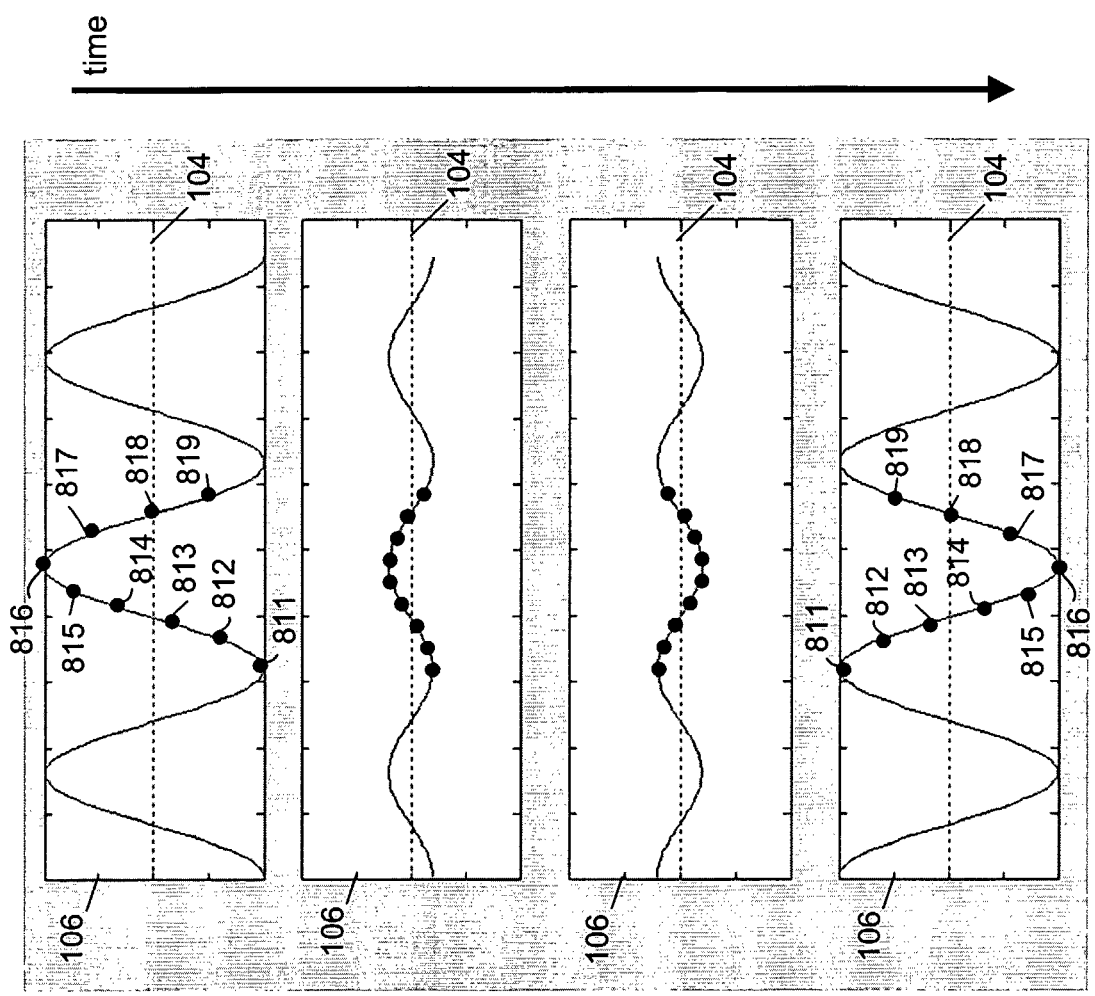

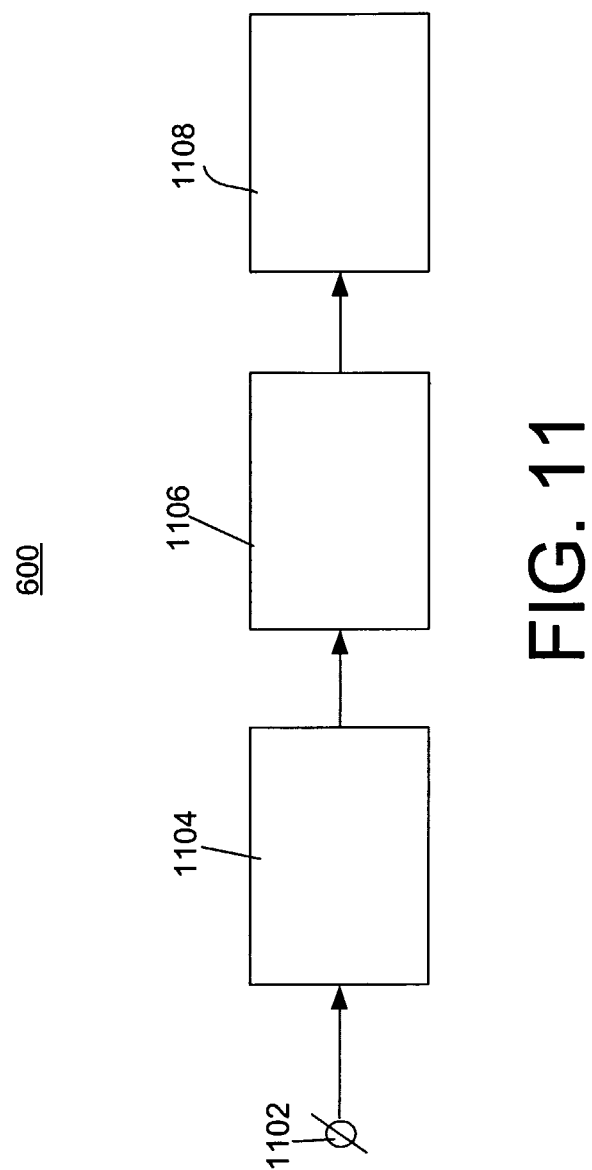

MULTIVIEW DISPLAY DEVICE

The invention relates to a multiview display device for displaying multiple views, the multiple views having respective viewing angles related to an object to be displayed.

The invention further relates to a method of driving a multiview display device for displaying multiple views, the multiple views having respective viewing angles related to an object to be displayed.

The invention further relates to a computer program product to be loaded by a computer arrangement, comprising instructions to drive a multiview display device for displaying multiple views, the multiple views having respective viewing angles related to an object to be displayed.

An embodiment of the multiview display device of the kind described in the opening paragraph is known from the U.S. Pat. No. 6,064,424. The display device is arranged to display multiple views. The views correspond to respective viewing angles relative to an object to be displayed, or the scene to be displayed. The views might correspond to actual angles of cameras relative to the scene of which images are acquired. Alternatively, the views correspond to angles of viewpoints in a graphics model which has been computed, optionally on basis of acquired images.

The display device comprises a structure of groups of adjacent light generating elements and a structure of lenses for directing the generated light in different directions relative to the display device. A first one of the groups of adjacent light generating elements in combination with a number of the lenses is arranged to display multiple viewing cones. Each of the viewing cones comprises the different views. The views have a predetermined angular distribution relative to the display device within such a viewing cone.

The display device further comprises driving means for providing the structure of groups of adjacent light generating elements with sets of image data corresponding to the respective views. FIG. 1 shows a typical viewing cone emerging from the middle of the display device. The example shows a viewing cone containing 9 different views, each view having a width of typically 1°-2°. The viewer receives a different view in each of his eyes. The disparity between the views together with other depth cues causes the depth perception.

Typically the views are rendered substantially realistically in a monotonously increasing fashion. Often the sets of image data are provided such that the angular distribution is linear increasing, i.e. pairs of adjacent views have substantially mutually equal differences between the viewing angles. The actual observation angle substantially corresponds to the viewing angle under which corresponding image data has been recorded. As long as both eyes stay within the viewing cone the viewer can sort of look around the displayed object. Within the cone the image is orthoscopic, meaning that the left eye receives a "left" image and the right eye receives a "right" image.

Figure 2:
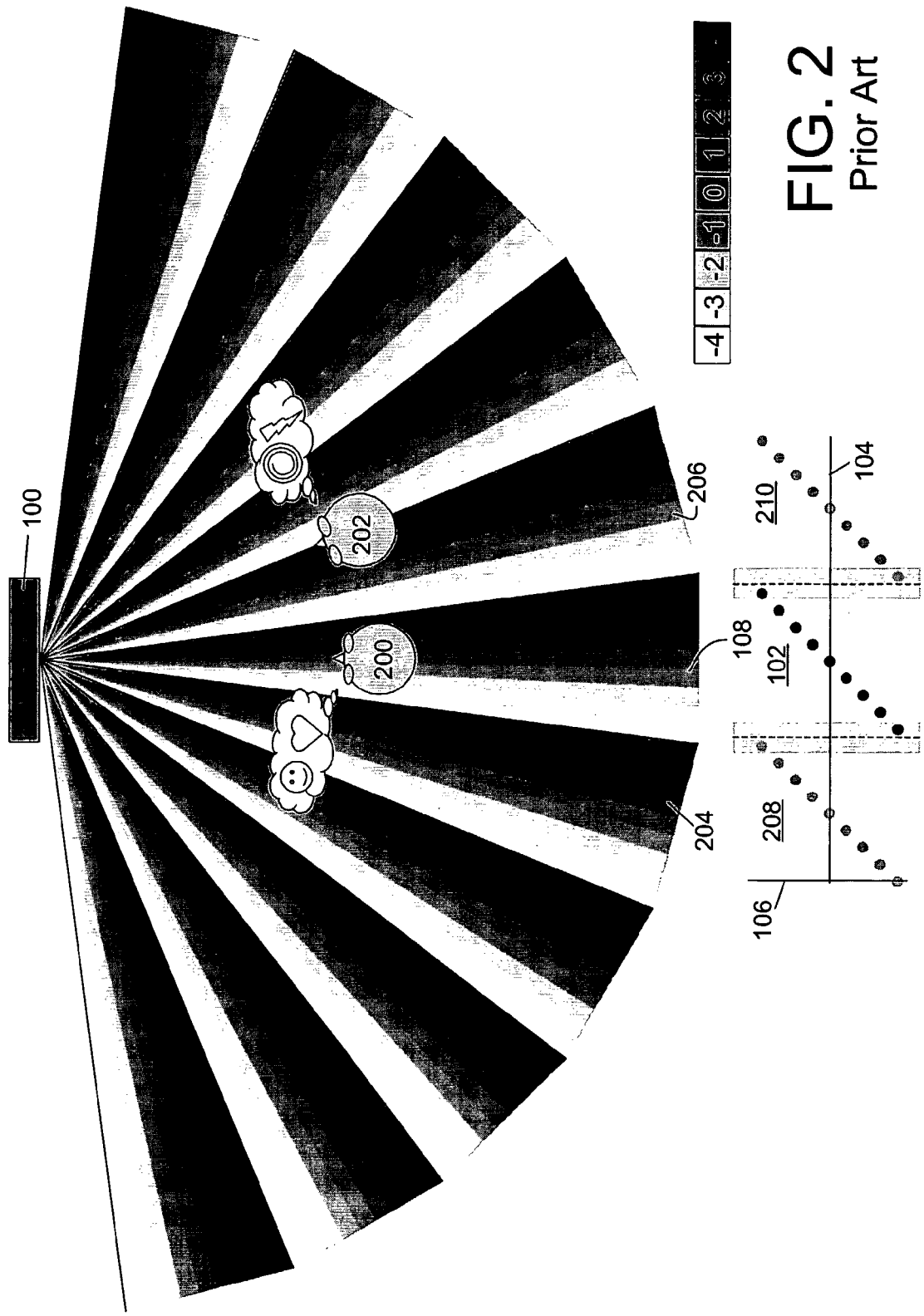

Because of the construction of the display device, the views are periodically disposed in the adjacent viewing cones. This is schematically shown in FIG. 2. That means that if the user walks around the display device he will cross the boundaries between adjacent viewing cones. For predetermined angles relative to display device the views observed with the left and right eye will not properly match. In the case of e.g. a 9-view display device the left eye will receive e.g. the $9^{th}$ view of a first viewing cone and the right eye will receive e.g. the $1^{st}$ view of an adjacent viewing cone. The result is what is called a pseudoscopic image, i.e. "inverted stereo". The depth cue related to disparity does not match with other depth cues in the views. The person skilled in the art considers pseudoscopic images as wrong, i.e. negative.

Figure 3:
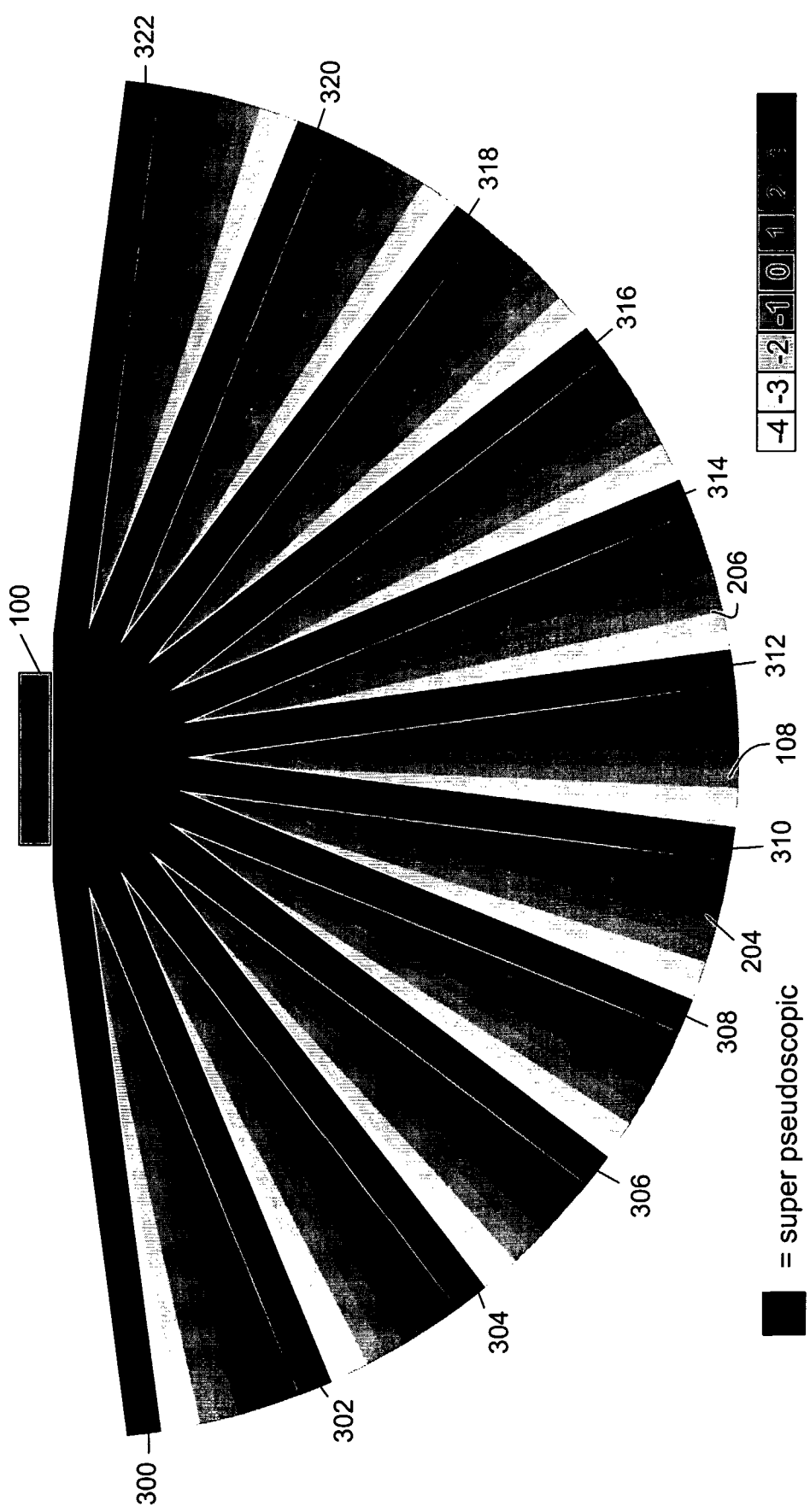

Even more severe is the fact that, for these predetermined angles, there is a very large disparity between the observed views. This disparity can be that large that the observer perceives double images in predetermined regions, i.e. the observer is no longer able to accommodate these images. These predetermined regions are defined as super-pseudoscopic. In FIG. 3 a number of these super-pseudoscopic regions "emerging" from the middle of the display device are indicated in black.

It is an object of the invention to provide a multiview display device of the kind described in the opening paragraph, the multiview display device generating views without super-pseudoscopic regions.

This object is achieved in that the display device comprises:
optical means for displaying multiple viewing cones, a first one of the multiple viewing cones having an angular distribution of the views relative to the display device; and
driving means for providing the optical means with sets of image data corresponding to the respective views,
whereby the sets of image data are provided such that:
the angular distribution has a first part of adjacent views with increasing viewing angle and a second part of adjacent views with decreasing viewing angle; and
the angular distribution has a first one of the views in between a maximum view which corresponds to a maximum viewing angle and a minimum view which corresponds to a minimum viewing angle.

That means that the angular distribution of the views is not linear increasing as typically applied in the prior art display device but that the angular distribution is partly increasing and partly decreasing. Preferably, the views are distributed within a viewing cone such that two views at opposite boundaries of a viewing cone have a minimum difference in viewing angle.

It should be noted that using an angular distribution having both increasing and decreasing viewing angles is not obvious. The person skilled in the art of multiview display devices is aware of pseudoscopic images. As described above, pseudoscopic images are not wanted. So, the person skilled in the art will drive the display device such that it generates views causing a minimum of pseudoscopic images. The inventors have observed that the presence of super-pseudoscopic regions is much more severe than the presence of pseudoscopic images. To prevent super-pseudoscopic regions, the display device according to the invention is driven such that some pseudoscopic images are generated.

In an embodiment of the display device according to the invention, the first part of adjacent views comprises a first number of views and the second part comprises a second number of views, a difference between the first number and the second number being minimal. In other words the first part and the second part have substantially the same number of views. It will be clear that in the case of a viewing cone with an odd number of views the difference between the first number and the second number will at least be equal to one. An advantage of this embodiment is that differences in viewing angles between the most of the adjacent views are mutually substantially equal.

In another embodiment of the display device according to the invention the first part of adjacent views comprises a first number of views and the second part comprises a second number of views, the first number being higher than the second number but being lower than four times the second number. These ratios between increasing pairs of viewing angles and decreasing pairs of viewing angles, corresponding to stereoscopic images and pseudoscopic images, correspond with a good balance between having a depth impression caused by disparity and preventing super-pseudoscopic regions.

In an embodiment of the display device according to the invention, the first part of adjacent views comprises a first number of views and the second part comprises a second number of views, the first number being higher than the second number, whereby a portion of the sets of image data corresponding to one or more of the adjacent views with decreasing viewing angle has been blurred. Because the first number is higher than the second number, the amount of disparity for the pseudoscopic images, i.e. corresponding to the adjacent views with decreasing viewing angle, is higher than for the stereoscopic images. The effect of a relatively high disparity may be ghosting, which can result in an uncomfortable viewing experience. To reduce or to prevent ghosting in the pseudoscopic images one or more of these images, i.e. a portion of the sets of image data corresponding one or more of the adjacent views with decreasing viewing angle has been blurred. Blurring may be a post processing after rendering the image data. Alternatively, it may be a part of the rendering itself. The blurring may be performed by the multi-display device according to the invention or by another device which provides the image data to the multi-display device. The effect of this blurring is that the pseudoscopic images are perceived less sharp than the stereoscopic images. This simply and gently encourages the user to move his head to the region in which he can view the stereoscopic images.

In an embodiment of the display device according to the invention, a portion of the sets of image data is blurred, the amount of blur being applied to the adjacent views being related to the viewing angle. This simply and gently encourages the user to move his head to the region in which the images are sharpest, i.e. less blurred.

The blurring may be both in horizontal and vertical direction. Preferably, the blurring is only in horizontal direction.

Preferably the radius that is used to blur the images is based on the disparity. A larger disparity corresponds to more blurring.

In an embodiment of the display device according to the invention, a first one of the sets of image data corresponding to a second one of the views which belongs to the first part, also corresponds to a third one of the views which belongs to the second part. In other words, the second one of the views and the third one of the views corresponds to the same image content. Consequently less image content is required when compared to the standard way of rendering. This is advantageous in the image processing part of the display device.

In an embodiment of the display device according to the invention, the driving means are arranged to provide the sets of image data such that the first one of the multiple viewing cones has the angular distribution at a first moment in time and has a further angular distribution at a second moment in time, the further angular distribution being different from the angular distribution. As said above, the presence of pseudoscopic regions is less severe than the presence of super-pseudoscopic regions. However viewers might find the pseudoscopic regions uncomfortable after watching a while. This embodiment of the display device according to the invention is arranged to change the position of the orthoscopic and pseudoscopic regions in time. This means that the angular distribution of the views is a function of time.

Preferably, an embodiment of the display device according to the invention which is arranged to control the angular distribution of the views as function of time, comprises means for shot-cut detection being arranged to control the driving means in order to switch between the angular distribution and the further angular distribution on basis of a detected shot-cut in the image data. Shot-cut detection is well-known technique which is amongst others described in the following patents U.S. Pat. No. 6,100,941 and U.S. Pat. No. 6,496,228 and patent application EPI 180307. The article "Comparison of Automatic Shot Boundary Detection Algorithms", by Lienhart R., in Proceedings of Storage and Retrieval for Image and Video Databases VII, pp. 290-301, vol. 3656, January 1999, San Jose, Calif., USA. gives an overview known techniques.

Alternatively, or in combination with adaptation of the angular distribution as function of time, the angular distribution is adapted in a spatial sense. Hence, an embodiment of the display device according to the invention comprises further optical means for displaying further viewing cones, a second one of the further multiple viewing cones having a second angular distribution of the views relative to the display device being substantially different from the angular distribution.

It is a further object of the invention to provide a method of driving a multiview display device of the kind described in the opening paragraph, the multiview display device generating views without super-pseudoscopic regions.

This object of the invention is achieved in that the method comprises providing the sets of image data to the driving means such that:
  the angular distribution has a first part of adjacent views with increasing viewing angle and a second part of adjacent views with decreasing viewing angle; and
  the angular distribution has a first one of the views in between a maximum view which corresponds to a maximum viewing angle and a minimum view which corresponds to a minimum viewing angle.

It is a further object of the invention to provide a computer program product of the kind described in the opening paragraph, the multiview display device generating views without super-pseudoscopic regions.

This object of the invention is achieved in that, the computer arrangement comprising processing means and a memory, the computer program product, after being loaded, providing said processing means with the capability to provide the sets of image data to the driving means such that:
  the angular distribution has a first part of adjacent views with increasing viewing angle and a second part of adjacent views with decreasing viewing angle; and
  the angular distribution has a first one of the views in between a maximum view which corresponds to a maximum viewing angle and a minimum view which corresponds to a minimum viewing angle.

Modifications of the multiview display device and variations thereof may correspond to modifications and variations thereof of the method and the computer program product, being described.

Figure 6:
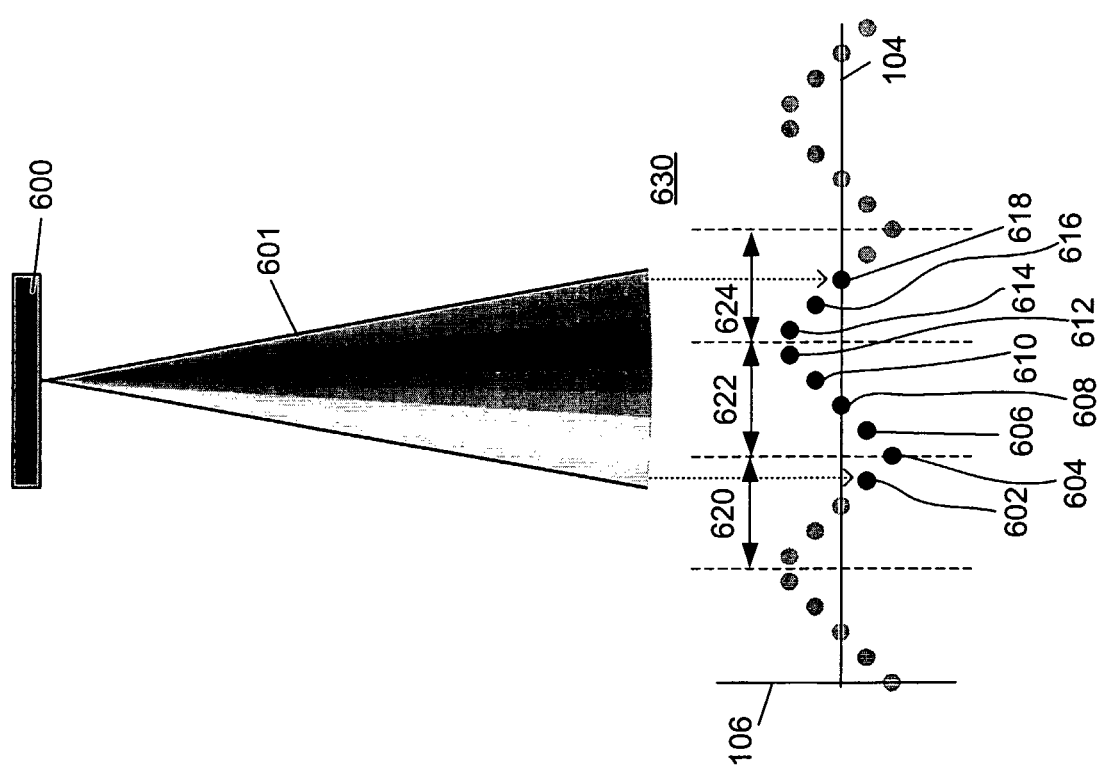
Figure 7:
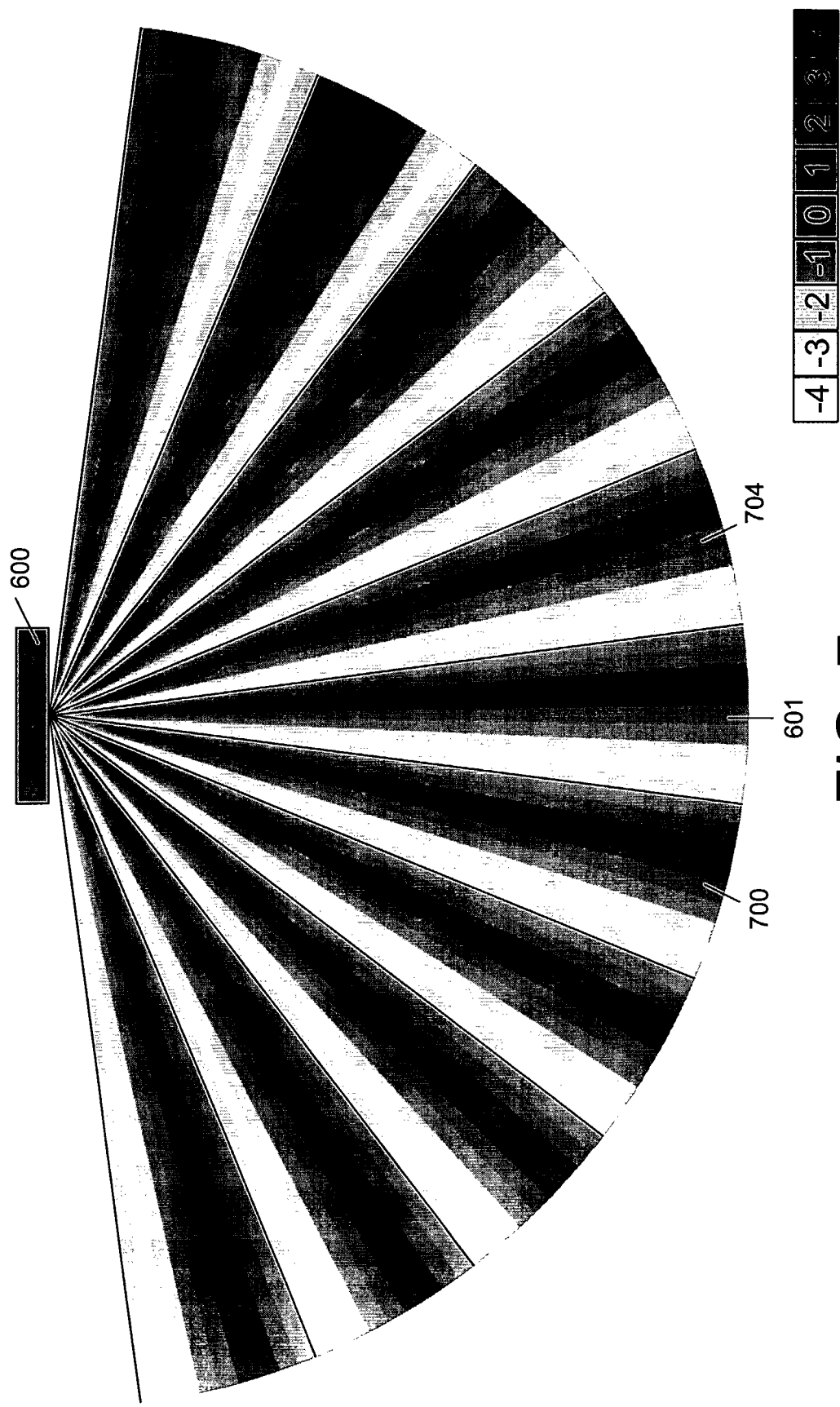
Figure 8A:
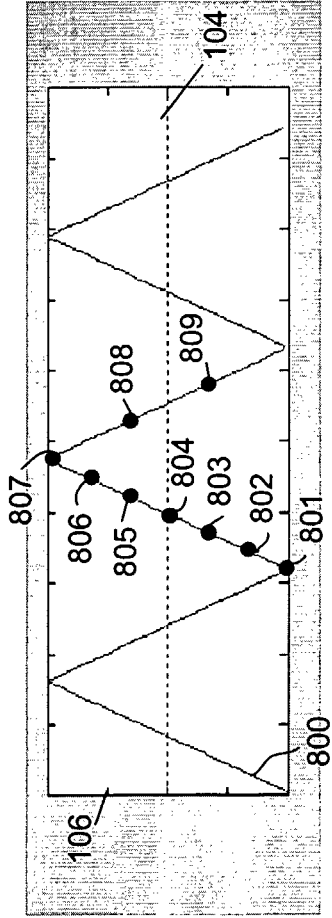
Figure 8B:
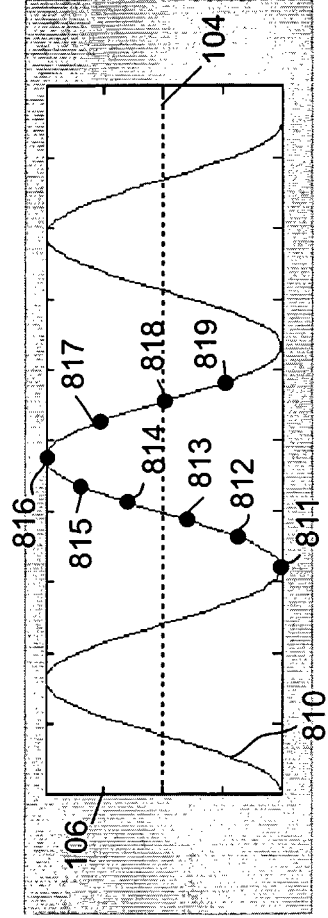
Figure 8C:
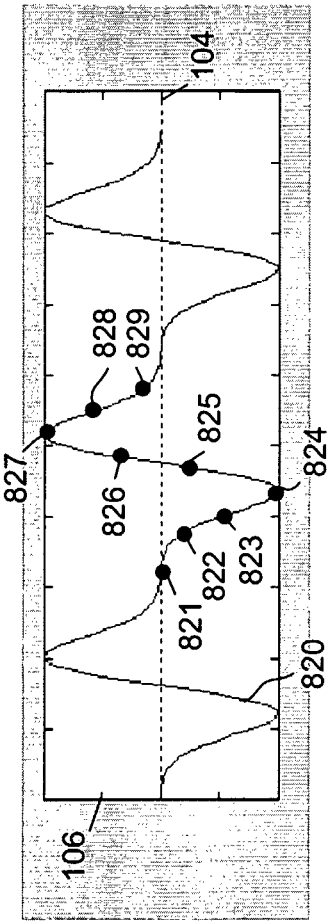
Figure 10:
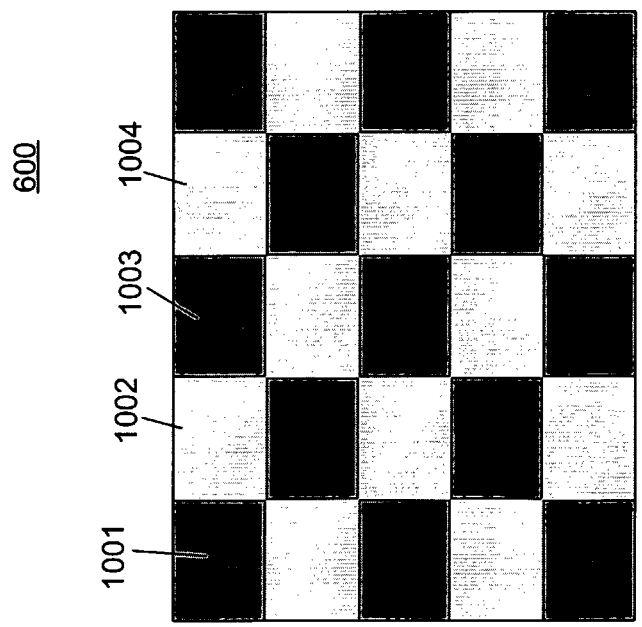

These and other aspects of the multiview display device of the method and of the computer program product, according to the invention will become apparent from and will be elucidated with respect to the implementations and embodiments described hereinafter and with reference to the accompanying drawings, wherein:

FIG. 1 shows a typical viewing cone according to the prior art, emerging from the middle of the display device;

FIG. 2 schematically shows that views are periodically disposed in adjacent viewing cones, according to the prior art;

FIG. 3 schematically shows a number of super-pseudoscopic regions corresponding to the viewing cones emerging from the middle of the display device which is driven according to the prior art;

FIG. 4A schematically shows view-point correction according to the prior art;

FIG. 4B schematically shows the effect of view-point correction according to the prior art, on the super-pseudoscopic regions;

FIG. 5 schematically shows the super-pseudoscopic regions corresponding to all viewing cones of the display device which is driven according to the prior art;

FIG. 6 shows a typical viewing cone emerging from the middle of the display device, according to the invention;

FIG. 7 schematically shows that views are periodically disposed in adjacent viewing cones, according to the invention;

FIGS. 8A, 8B and 8C schematically show a number of angular distributions;

FIGS. 9A, 9B, 9C and 9D schematically show an angular distribution as function of time;

FIG. 10 schematically shows a spatial distribution of angular distributions; and FIG. 11 schematically shows a multiview display device according to the invention.

Same reference numerals are used to denote similar parts throughout the Figures.

FIG. 1 shows a typical viewing cone 108 according to the prior art, emerging from the middle of the display device 100. The example shows a viewing cone 108 containing 9 different views, each view having a width of typically 1°-2°. Each view has its own index ranging from −4 till 4. The black dots in the x-y plot corresponds to the respective 9 views. The x-axis 104 corresponds to the observation angle, which for the viewing cone corresponds to an angle relative to the display device 100. The y-axis 106 corresponds to the viewing angle. By means of the black dots the angular distribution 102 of the views within the viewing cone 108 is schematically shown. In this case the angular distribution 102 is linear increasing, i.e. pairs of adjacent views have substantially mutually equal differences between the viewing angles.

FIG. 2 schematically shows that views are periodically disposed in adjacent viewing cones 204, 108, 206, according to the prior art. The viewing cones 204, 108, 206 have mutually substantially angular distributions 208, 102, 210. There can be minor differences which are caused by the fact that the structure of light generating elements has minor imperfections or the structure of lenses or barriers has minor imperfections. The sequence, i.e. order of views within the viewing cones 204, 108, 206 is fixed.

FIG. 2 schematically shows two observers 200 and 202. The first observer 200 is located at an appropriate position relative to the display device 100. The first observer 200 sees a correct stereo image. That means that his left eye observes a view which should be observed by his left eye while his right eye observers a view which should be observed by his right eye. However, the second observer 202 is not located at an appropriate position relative to the display device 100. The second observer 202 does not see a correct stereo image but he sees a pseudoscopic image. That means that his left eye observes a view which should be observed by his right eye while his right eye observers a view which should be observed by his left eye.

FIG. 3 schematically shows a number of super-pseudoscopic regions 300-322 corresponding to the viewing cones 204, 108, 206 emerging from the middle of the display device 100 which is driven according to the prior art. Super-pseudoscopic regions correspond to regions in front of the display device 100 where a very large disparity between observed views exist. This disparity can be that large that the observer perceives double images. In FIG. 3 a number of these super-pseudoscopic regions 300-322 "emerging" from the middle of the display device are indicated in black.

FIG. 4A schematically shows view-point correction according to the prior art. Preferably a multiview display device 100 is designed such that the different viewing cones 402, 400, 108 originating from different positions of the display device 100 overlap at a predetermined viewing distance from the display device 100. This distance is related to the application of the multiview display device 100. For a multiview display device being applied as a monitor of a personal computer this predetermined distance is typically 50-60 cm. For a multiview display device being applied for viewing by multiple persons simultaneously, e.g. for presentations or for watching television broadcasts, this predetermined distance is larger, e.g. in the range of 1-5 m.

View-point correction is a known technique and is achieved by adapting the pitch of the lenticular lenses relative to the light generating elements: the pitch of lenses is slightly smaller than the distance between adjacent groups of light generating elements. Alternatively, in the case of a multiview display device on basis of a rear barrier, view-point correction is achieved by adapting the pitch of the barriers relative to the light generating elements: the pitch of the barriers is slightly larger than the distance between adjacent light generating elements. FIG. 4B schematically shows the effect of view-point correction according to the prior art, on the super-pseudoscopic regions. It can be clearly seen that the super-pseudoscopic regions of the different viewing cones 402, 108, 400 overlap with each other.

FIG. 5 schematically shows the super-pseudoscopic regions corresponding to all viewing cones of the display device 100 which is driven according to the prior art. FIG. 5 schematically shows the region 500 in which different views of the display device 100 can be seen by a typical observer. FIG. 5 also shows the regions 502-522 in which stereoscopic images can be observed. These latter regions 502-522 are relatively small compared with the former region 500. In other words, the number of and size of regions in which a person can be located to observe stereoscopic images is relatively small if the display device 100 is driven by means of viewing cones having an angular distribution according to the prior art.

FIG. 6 shows a typical viewing cone 601 emerging from the middle of the display device 600, according to the invention. The example shows a viewing cone 601 containing 9 different views, each view having a width of typically 1°-2°. The black dots in the x-y plot corresponds to the respective 9 views. The x-axis 104 corresponds to the observation angle, which for the viewing cone 601 corresponds to an angle relative to the display device 100. The y-axis 106 corresponds to the viewing angle. Hence, by means of the black dots the angular distribution 630 of the views within the viewing cone 601 is schematically shown.

In general, the angular distributions 630 according to the invention can be characterized as follows:

First, the angular distribution has a first part of adjacent views with increasing viewing angle and a second part of adjacent views with decreasing viewing angle; and Secondly, the angular distribution has a first one of the views in between a maximum view which corresponds to a maximum viewing angle and a minimum view which corresponds to a minimum viewing angle.

As can be seen in FIG. 6, the views corresponding to black dots 604-612 belong to the first part of adjacent views with increasing viewing angle, i.e. the viewing angle of the view corresponding to the black dot with reference number 606 is higher than the viewing angle of the view corresponding to the black dot with reference number 604, while the viewing angle of the view corresponding to the black dot with reference number 608 is higher than the viewing angle of the view corresponding to the black dot with reference number 606.

As can be seen in FIG. 6, the views corresponding to black dots 614-618 belong to the second part of adjacent views with decreasing viewing angle, i.e. the viewing angle of the view corresponding to the black dot with reference number 614 is lower than the viewing angle of the view corresponding to the black dot with reference number 612, while the viewing angle of the view corresponding to the black dot with reference number 618 is lower than the viewing angle of the view corresponding to the black dot with reference number 614.

As can be seen in FIG. 6 there are views, e.g. corresponding to the black dot with reference number 608 in between a maximum view which corresponds to a maximum viewing angle and which is indicated with reference number 612 and a minimum view which corresponds to a minimum viewing angle and which is indicated with reference number 604.

FIG. 6 shows an example of a "cyclic" angular distribution which is smooth at the boundaries of the viewing cones. The difference between the viewing angle corresponding to the view at a first boundary of the viewing cone 601, indicated with black dot with reference number 602 and the viewing angle corresponding to the view at a second boundary of the viewing cone 601, indicated with black dot 618 is minimum. In other words, there is no jump, i.e. a big difference between viewing angles between adjacent views belonging to two different viewing cones. This can also be observed in FIG. 7 which schematically shows that views are periodically disposed in adjacent viewing cones, according to the invention.

FIG. 6 also shows which views corresponds to stereoscopic regions, e.g. 622 and which views corresponds to pseudoscopic regions e.g. 620 and 624. In this case the number of pairs of adjacent views in the stereoscopic regions is equal to the number of pairs of adjacent views in the pseudoscopic regions. It will be clear that alternative separations between views can be made. For instance the number of pairs of adjacent views in the stereoscopic regions can be higher than the number of pairs of adjacent views in the pseudoscopic regions.

In FIG. 6 can also be observed that a number of views have the same viewing angle. For instance the view corresponding to the black dot with reference number 602 has the same viewing angle as the view corresponding to the black dot with reference number 606. That means that the same image data is to be provided for creating these views. Further, the viewing angles of the respective views corresponding to the black dots with reference numbers 608 and 618 are mutually equal. The same holds for the views corresponding to the black dots with reference numbers 610 and 616 and for the views corresponding to the black dots with reference numbers 612 and 614. As a consequence, only five sets of image data have to be provided for the creation of the nine views.

FIGS. 8A, 8B and 8C schematically show a number of angular distributions. FIG. 8A shows an angular distribution according to the invention, which corresponds with a triangle shaped waveform 800. Each viewing cone comprises nine views. The different views correspond to the respective black dots with reference numbers 801-809. There are six pairs of adjacent views which belong to the first part, i.e. increasing viewing angle. There are two pairs of adjacent views which belong to the second part, i.e. decreasing viewing angle. The view corresponding to the black dot indicated with reference number 803 and the view corresponding to the black dot indicated with reference number 809 have mutually equal viewing angles. Also, the view corresponding to the black dot indicated with reference number 805 and the view corresponding to the black dot indicated with reference number 808 have mutually equal viewing angles. Having mutually equal viewing angles does not necessarily mean that the applied image data is mutually equal. Preferably, the view corresponding to the black dot indicated with reference 809 is based on blurring, i.e. low-pass filtering e.g. by means of a Gaussian filter, the image data of the view corresponding to the black dot indicated with reference 803. Preferably, the view corresponding to the black dot indicated with reference 808 is based on blurring the image data of the view corresponding to the black dot indicated with reference 805

FIG. 8B shows an angular distribution according to the invention, which corresponds with a sinus shaped waveform 810. The sinus shape results into a continuous periodic angular distribution of the views over the adjacent viewing cones. Each viewing cone comprises nine views. The different views correspond to the respective black dots with reference numbers 811-819. There are five pairs of adjacent views which belong to the first part, i.e. increasing viewing angle. There are three pairs of adjacent views which belong to the second part, i.e. decreasing viewing angle.

FIG. 8C shows that an arbitrary shaped waveform 820 can be used for the mapping of the different views. The different views correspond to the respective black dots with reference numbers 821-829.

FIGS. 9A, 9B, 9C and 9D schematically show an angular distribution as function of time. Each viewing cone comprises nine views. The different views correspond to the respective black dots with reference numbers 811-819. The angular distribution corresponds with a sinus shaped waveform which changes as function of time. That means that during a first period of time the viewing angles are changing little by little such that they all become mutually equal and that during a second period of time the differences between the viewing angles are increasing little by little. This process is repeated.

Alternatively, there are only two states, e.g. as depicted in FIG. 9A and as depicted in FIG. 9D. The multiview display device according to the invention is arranged to switch between these two states. This switching can be performed at fixed time intervals e.g. every second or every 10 seconds. Preferably, the switching between those two states is based on the image content to be shown on the multiview display device. Suppose that the image data to be shown represents a video sequence, e.g. a movie or talk show. A shot-cut detection unit is arranged to detect shot-cuts within that video sequence. A first part of the video sequence is being rendered such that there are nine views. These views are provided to the driving means of the multiview display device such that an angular distribution as depicted in FIG. 9A is realized. As soon as a shot cut is detected, the multiview display device switches to the other state, i.e. corresponding to the angular distribution as depicted in FIG. 9D. From that moment on the different views are rendered in correspondence to that state. A subsequent shot-cut results in a change of state corresponding to an angular distribution as depicted in FIG. 9A. That means, every time a shot-cut is detected the angular distribution is changed.

Instead of changing the angular distribution as a function of time or preferably in combination with such a change the angular distribution is also modulated in a spatial sense. FIG. 10 schematically shows a spatial distribution of angular distributions. FIG. 10 shows a checker-board pattern of angular distributions. Some parts 1001 and 1003 of the multiview display device have a first angular distribution while other parts 1002 and 1004 of the multiview display have a second angular distribution which is different from the first angular distribution. For instance the former parts have an angular distribution as depicted in FIG. 9A while the latter parts have an angular distribution as depicted in FIG. 9D. It will be clear that an alternative spatial distribution is also possible, e.g. a bar pattern.

FIG. 11 schematically shows a multiview display device 600 according to the invention. The multiview display device and 600 comprises:
- receiving means 1104 for receiving a signal representing input image data;
- optical means 1108 for displaying multiple viewing cones. The viewing cones have angular distributions of views relative to the display device, as described in connection with any of the FIGS. 6-10;
- driving means 1106 for providing the optical means 1108 with sets of image data corresponding to the respective views.

The signal may be a broadcast signal received via an antenna or cable but may also be a signal from a storage device like a VCR (Video Cassette Recorder) or Digital Versatile Disk (DVD). The signal is provided at the input connector 1102. The multiview display device 600 might e.g. be a TV. Optionally the image processing apparatus 400 comprises storage means, like a hard-disk or means for storage on removable media, e.g. optical disks.

The optical means are a combination of light generating elements and light directing elements. Light generating elements are e.g. pixels from an LCD or from a LED display. Light directing elements are lenses or alternatively barriers. Both types of optical means are known in the prior art. The optical means on basis of lenses is e.g. disclosed in U.S. Pat. No. 6,064,424.

The received input image data might comprise a series of image data sets corresponding to the different views. Alternatively, the input image data is a single video sequence and the receiving means 1104 is arranged to compute the series of image data sets. Preferably, the input image data comprises depth information in the form of depth maps. Alternatively the depth maps are computed on basis of the video sequence. On basis of the video sequence and the depth information the image data sets are rendered. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124.

The rendering means and the driving means 1106 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

In the provided examples in this specification the number of views of the multiview display device is 9. It should be noted that an other number of views is also possible.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A multiview display device for displaying multiple views for observation at different observation angles relative to the multiview display device including at a first observation angle and a second observation angle, the multiple views having respective viewing angles related to an object to be displayed, the display device comprising:
   an optical device configured to display multiple viewing cones, a first cone of the multiple viewing cones comprises different views so that a different view is observed by a right eye and a left eye of a viewer of the multiview display device, the different views of the first cone having an angular distribution relative to the display device; and
   a processor configured to provide the optical device with sets of image data corresponding to the respective views, whereby the sets of image data are provided such that:
      the angular distribution has a first part of adjacent views with increasing viewing angle and a second part of adjacent views with decreasing viewing angle;
      a difference between a viewing angle corresponding to the first observation angle of a first view at a first boundary of the first viewing cone and a viewing angle corresponding to the second observation angle of a second view at a second boundary of the first viewing cone is minimized; and
      the angular distribution has a first one of the views in between a maximum view which corresponds to a maximum viewing angle and a minimum view which corresponds to a minimum viewing angle.

2. The multiview display device as claimed in claim 1, whereby the first part of adjacent views comprises a first number of views and the second part comprises a second number of views, a difference between the first number and the second number being minimal.

3. The multiview display device as claimed in claim 1, whereby the first part of adjacent views comprises a first number of views and the second part comprises a second number of views, the first number being higher than the second number but being lower than four times the second number.

4. The multiview display device as claimed in claim 1, whereby the first part of adjacent views comprises a first number of views and the second part comprises a second number of views, the first number being higher than the second number, whereby a portion of the sets of image data corresponding to one or more of the adjacent views with decreasing viewing angle has been blurred.

5. The multiview display device as claimed in claim 1, whereby a portion of the sets of image data is blurred, the amount of blur being applied to the adjacent views being related to the viewing angle.

6. The multiview display device as claimed in claim 1, whereby a first one of the sets of image data corresponding to a second one of the views which belongs to the first part, also corresponds to a third one of the views which belongs to the second part.

7. The multiview display device as claimed in claim 1, whereby the processor is further configured to provide the sets of image data such that the first one of the multiple viewing cones has the angular distribution at a first moment in time and has a further angular distribution at a second moment in time, the further angular distribution being different from the angular distribution.

8. The multiview display device as claimed in claim 7, comprising a shot-cut detector being arranged to control the processor in order to switch between the angular distribution and the further angular distribution on basis of a detected shot-cut in the image data.

9. The multiview display device as claimed in claim 1, comprising a further optical device configured to display further viewing cones, a second one of the further multiple viewing cones having a second angular distribution of the views relative to the display device being substantially different from the angular distribution.

10. A method of driving a multiview display device for displaying multiple views for observation at different observation angles relative to the multiview display device including at a first observation angle and a second observation angle, the multiple views having respective viewing angles related to an object to be displayed, the method comprising the act of:
  displaying by an optical device multiple viewing cones, a first cone of the multiple viewing cones comprises different views so that a different view is observed by a right eye and a left eye of a viewer of the multiview display device, the different views of the first cone having an angular distribution of the views relative to the display device; and
  providing the optical device with sets of image data corresponding to the respective views such that:
    the angular distribution has a first part of adjacent views with increasing viewing angle and a second part of adjacent views with decreasing viewing angle;
    minimizing a difference between a viewing angle corresponding to the first observation angle of a first view at a first boundary of the first viewing cone and a viewing angle corresponding to the second observation angle of a second view at a second boundary of the first viewing cone; and
    the angular distribution has a first one of the views in between a maximum view which corresponds to a maximum viewing angle and a minimum view which corresponds to a minimum viewing angle.

11. A non-transitory computer-readable storage medium encoded with a computer program to be loaded into a computer arrangement, said computer program comprising instructions for causing the computer arrangement to drive a multiview display device for displaying multiple views for observation at different observation angles relative to the multiview display device including at a first observation angle and a second observation angle, the multiple views having respective viewing angles related to an object to be displayed, the display device comprising:
  an optical device configured to display multiple viewing cones, a first cone of the multiple viewing cones comprises different views so that a different view is observed by a right eye and a left eye of a viewer of the multiview display device, the different views of the first cone having an angular distribution of the views relative to the display device; and
  a driver configured to provide the optical device with sets of image data corresponding to the respective views, the computer arrangement comprising a processor and a memory, the computer program, after being loaded in the memory, providing said processor with a capability to provide the sets of image data to the driver such that:
    the angular distribution has a first part of adjacent views with increasing viewing angle and a second part of adjacent views with decreasing viewing angle;
  minimizing a difference between a viewing angle corresponding to the first observation angle of a first view at a first boundary of the first viewing cone and a viewing angle corresponding to the second observation angle of a second view at a second boundary of the first viewing cone; and
  the angular distribution has a first one of the views in between a maximum view which corresponds to a maximum viewing angle and a minimum view which corresponds to a minimum viewing angle.

* * * * *